United States Patent [19]
Jang et al.

[11] Patent Number: 6,136,434
[45] Date of Patent: Oct. 24, 2000

[54] HIGH TEMPERATURE RESISTANT COLORED ENAMEL WIRES

[75] Inventors: Chih-Min Jang, Taipei; Ru-Shi Liu, Hsinchu Hsien; Chi-Ting Du; Tsair-Shyang Huang, both of Taipei; Yao-Chung Tu, Hsinchu; Wen-Hsiung Liu, Taipei; Wen-Cheng Wu, Taipei Hsien; Tsen-Hsu Lin, Hsinchu, all of Taiwan

[73] Assignee: Tai_I Electric Wire & Cable Co., Ltd., Taiwan

[21] Appl. No.: 09/264,503

[22] Filed: Mar. 8, 1999

[30] Foreign Application Priority Data

Dec. 19, 1998 [TW] Taiwan .................................. 87121278

[51] Int. Cl.⁷ ...................................................... D02G 3/00
[52] U.S. Cl. .......................... 428/372; 428/379; 428/389; 174/110 A; 174/112
[58] Field of Search ................................ 174/110 A, 112; 428/379, 375, 389, 372

[56] References Cited

U.S. PATENT DOCUMENTS

| | | | |
|---|---|---|---|
| 4,935,302 | 6/1990 | Hjortsberg et al. | 428/383 |
| 5,654,095 | 8/1997 | Yin et al. | 428/372 |
| 5,834,117 | 11/1998 | Onishi | 428/379 |

*Primary Examiner*—William Krynski
*Assistant Examiner*—J. Gray
*Attorney, Agent, or Firm*—Ladas & Parry

[57] ABSTRACT

A high temperature resistant colored enamel wire comprises a metal conductive wire and at least one colored coating layer outside the wire, the at least one colored coating layer is provided by a coating composition comprising (a) a synthetic resin, (b) an organic solvent and (c) an inorganic pigment. In addition to having good appearance and uniform color, the high temperature resistant colored enamel wire can provide the temperature resistance and insulation properties meeting the requirements of the art.

11 Claims, No Drawings

HIGH TEMPERATURE RESISTANT COLORED ENAMEL WIRES

BACKGROUND OF INVENTION

Colored enamel wires have been widely used in various electric facilities and are basically composed of metal wires and insulation coating layer(s) surrounding the wires. An enamel wire is conventionally prepared by the following procedures:

continuously drawing a metal wire to size→annealing the wire→cooling and drying the wire→coating the wire with one or more coating layers of flowable resin materials→curing the resin materials→hardening the resin materials (if necessary).

In addition to showing the functions of different wires to facilitate the winding operation of the wires and reduce man-made errors, the colored coating layers of enamel wires can provide enamel wires with an aesthetic appearance and make them more valuable.

The colors of conventional enamel wires are provided either by the synthetic resins in coating layers or by organic pigments/dyes. It is believed that inorganic (metal) pigments are not suitable for enamel wires because they will negatively affect the properties such as appearance and flexibility of enamel wires. When using organic pigments/dyes to provide enamel wires with different colors, a metal wire is coated with a coating comprising a polymer and an organic pigment/dye, dried and cured, and then the pigment/dye and/or the reaction product of the pigment/dye with the polymer can provide the wire with a desired color. However, a high temperature operation is generally adopted to bake the coating layer into a film. The baking temperature depends on the coatings and is generally above 300° C. and up to 450° C. Hence, the high temperature operation can cause the organic pigments/dyes to evaporate or decompose and resulting in property changes and a non-uniform color.

In view of the poor temperature resistance of organic pigments/dyes, the temperature resistance grade of conventional colored enamel wires is generally below F grade (i.e. less than 155° C.). Wires coated with organic pigments/dyes-containing enamel also suffer from the disadvantages of narrow operation range, low productivity, non-uniform color, pinhole formation and catalyst (in furnace) poisoning. All the disadvantages will negatively affect the processing of enamel wires and their properties. Therefore, it is desirable to develop high temperature resistant colored enamel wires having colors not provided by the synthetic resins, being high temperature resistant, and being easily produced at low cost without changing the processing conditions.

The present invention can meet the above demands. Specifically, the present invention provides a enamel wire with desired color, high temperature resistance and long use span.

SUMMARY OF THE INVENTION

The present invention relates to a high temperature resistant colored enamel wire comprising a metal wire and at least one colored coating layer around the wire, wherein the at least one colored layer is provided by a coating composition comprising (a) a synthetic resin, (b) an organic solvent and (c) an inorganic pigment. The colored enamel wire has high temperature resistance and long use span, and has high voltage resistant duration.

These and other objects, advantages and features of the present invention will be more fully understood and appreciated by reference to the written specifications.

DETAILED DESCRIPTION OF THE INVENTION

While this specification concludes with claims particularly pointing out and distinctly claiming that which is considered to be the invention, it is believed that the invention can be better understood from a reading of the following detailed description of the invention.

Accordingly, the present invention provides a colored enamel wire whose color is not provided by the polymer in the coating layer(s) outside the wire. The enamel wire comprises a metal wire and at least one colored coating layer outside the wire. In addition to a synthetic resin and an organic solvent, the at least one colored coating layer further comprises an inorganic pigment to provide the desired color. Specifically, the at least one colored coating layer of the high temperature resistant colored enamel wire is provided by a coating composition comprising (a) a synthetic resin, (b) an organic solvent and (c) an inorganic pigment.

Any synthetic resins conventionally used in enamel wires can be used in the coating composition. The synthetic resins used in the present invention can be, but not limited to, modified or unmodified poly(aldehyde acetal), polyurethane, polyester, polyesterimide, polyamideimide, polyamide, polysulfone, polyimide resins, or mixtures thereof. The selection of synthetic resin depends on the required temperature resistance and insulation properties on the coating layers.

Any organic solvents conventionally used in enamel wires can be used in the coating composition. For instance, the organic solvent can be, but not limited to, cresols, hydrocarbons, dimethyl phenol, toluene, xylene, ethylbenzene, DMF (N,N-dimethyl formamide), NMP (N-methylpyrrolidone), esters, ketones, or mixtures thereof.

The coating layers of the colored enamel wire of the present invention can be provided by a coating composition comprising any suitable combination of synthetic resin and organic solvent. The coating composition preferably comprises, based on the total weight of the synthetic resin and the organic solvent, from 20 to 80 wt % of synthetic resin and from 20 to 80 wt % of organic solvent, and more preferably from 25 to 75 wt % synthetic resin and from 75 to 25 wt % organic solvent.

Suitable inorganic pigments for the present invention are metal oxides such as titanium oxide, zinc oxide, ferric oxide, chromic oxide, aluminum oxide, magnesium oxide, silicon oxide, stibnic oxide and lead oxide, metal powders such as powders of gold, silver, copper and aluminum, carbon blacks and/or lead yellow. The species of inorganic pigments incorporated into the coating composition will depend on the desired colors. In preferred embodiments of the present invention, the inorganic pigments are titanium oxide, chromic oxide, aluminum oxide and/or carbon blacks. It is preferred that the particle size of the pigments is in a range of from 0.001 to 50 microns, more preferred from 0.01 to 5 microns. The amount of pigments added to the coating composition is generally, based on 100 parts by weight of synthetic resin, from 1 to 60 parts by weight (1 to 60 PHR), preferably from 3 to 50 parts by weight (3 to 50 PHR), and more preferably from 15 to 30 parts by weight (15 to 30 PHR).

The pigments can be dispersed into the coating composition by high shear mixing. Optionally, the coating composition can further comprise a dispersant to enhance the dispersion of pigments to avoid the coagulation or precipitation of pigments, especially at the cases which will negatively affect the dispersion of pigments that the viscosity of the coating composition is too high/low or the amount of pigments is too heavy. In the latter case, the pigments will aggregate due to strong Van der Walls forces among pigments. Conventional dispersants such as surfactants, silanes, titanium coupling agents or aluminum coupling agents can be used in the coating composition. In the coating composition, the weight ratio of dispersant to the synthetic resin is from 0.0001 to 0.02.

The coating layers of the present invention can be provided by a coating composition prepared by mixing inorganic pigments, solvent, dispersant (if used) and other optional adjuvants to form a mixture, adding the mixture in batchwise or at one time into the resin, and dispersing the mixture by a high shear mixer.

The metal wire of the present invention can be in any form, generally is in a circular form or a rectangular form. In case the metal wire is in a circular form, it is preferred that the diameter of the wire is from 0.05 to 3.2 mm, more preferred from 0.10 to 1.5 mm. There can be one or more coating layers outside the wire and the coating compositions for different coating layers can be the same or different with the proviso that at least one of the coating layers is provided by a coating composition comprising inorganic pigments. Generally, the thickness of each layer is from 2.0 to 5.0 mils, preferably from 2.5 to 4.0 mils. The layer is provided by repeatedly applying the coating composition on the surface of wire for from five (5) to fifteen (15) times, and generally from five (5) to ten (10) times. The method of applying the coating depends on the viscosity of the coating. For instance, at 30° C., a coating having a viscosity of between 500 and 2000 cps is applied by dyes, a coating having a viscosity of between 100 and 200 cps is applied by a roller, and a coating having a viscosity of between 40 and 100 cps is applied by felt. The speed for applying the coating composition is between 3 and 450 m/min, and preferably between 5 and 40 m/min. The coated wire, after each coating layer has been applied, is fed into a furnace to dry and cure the layer. The temperature of the furnace will depend on the coating speed, the species of coating, the length of furnace and the thickness of coating layer. It is preferred that the temperature at the inlet of furnace is between 300 and 350° C. and the temperature at the outlet of furnace is between 350 and 700° C.

The following examples are offered by way of illustration. In the examples, the coatings applied are as follows:

(1) PU coating: PU-130-55, available from THF Electrical Industrial Co. Ltd. R.O.C., polyurethane which can be cured by heating at an elevated temperature and through a cross-linking reaction, the solvent of the coating comprises xylene, phenol, cresol acid and dimethyl phenol.

(2) PE coating: PB-12, available from Fu PAO Chemical Co. Ltd. R.O.C., polyester which can be cured by heating at an elevated temperature and through a transesterification or esterification reaction, the solvent of the coating comprises xylene, hydrocarbons, cresols and phenol.

(3) PEI coating: ISOMID-42, available from Misshoju-Schenectady Kagaku Co. Ltd. Japan, a polyesterimide coating which can be cured by heating at an elevated temperature and through a transesterification or esterification reaction, the solvent of the coating comprises xylene, hydrocarbons, cresols and phenol.

(4) PAI coating: TAI-AIW-31.5, available from Tai-I Electric Wire & Cable Co. Ltd. ROC., polyamideimide which can be cured by heating at an elevated temperature, the solvent of the coating comprises xylene, NMP and DMF.

EXAMPLES

Comparative Examples 1–4

Various coatings, that contained no inorganic pigments, were applied onto copper wires having a diameter of 1.0 mm. The properties of the coated wires are as follows:

TABLE I

| | | | | characteristics | | | | | | | |
|---|---|---|---|---|---|---|---|---|---|---|---|
| Ex. | coating | viscosity (cps) | solid contents (%) | appearance | flexibility[5] | pinholes[6] | adherence | heat shock[7] | softening temp. (° C.) | dielectric (kV) | color |
| 1 | PU | 1800 | 46.2 | good | × 1d | <1 | good | × 3d | 245 | 9.5 | C[a] |
| 2 | PE | 2100 | 42.3 | good | × 1d | <1 | good | × 3d | 305 | 11.2 | LB[b] |
| 3 | PEI | 2000 | 42.2 | good | × 1d | 0 | good | × 2d | 380 | 11.5 | RB[c] |
| 4 | PAI | 1500 | 30.2 | good | × 1d | 0 | good | × 1d | 410 | 11.1 | RB[c] |

Note:
[a]C = the color of copper
[b]LB = light brown
[c]RB = mahogany (1) The viscosity was determined by Brookfield Viscometer at 30° C.

(2) The solid contents for different coatings were determined under different conditions: PU: 170° C./2 hrs, PE, PEI, PAI: 200° C./2 hrs.

(3) Coating conditions:
PU: seven (7) times, coating speed: 7.5 m/min, inlet temperature: 300° C., outlet temperature: 350° C.
PE: six (6) times, coating speed: 11.5 m/min, inlet temperature: 420° C., outlet temperature: 480° C.
PEI: eight (8) times, coating speed: 10 m/min, inlet temperature: 420° C., outlet temperature: 500° C.
PAI: ten (10) times, coating speed: 10.5 m/min, inlet temperature: 420° C., outlet temperature: 480° C.

(4) Test methods used are those according to the NAME 1000 standards.

(5) In the flexibility test the term "×1d" indicates that the characteristics of the enamel wires are acceptable when they are tested after having been wound around a mandrel having a diameter which is the same as the diameter of the wire conductor (6) An average number of pinholes found in six (6) meters of enamel wire.

(7) In the heat shock test the term "×1d", "×2d" or "×3d" indicates that the characteristics of the enamel wires are acceptable when the are tested after having been wound around a mandrel having a diameter which is the same as the diameter of the wire or which is 2 or 3 times as large as that of the wire conductor.

Comparative Example 5

The same as Comparative Example 1 with the exception that 2 wt % of red organic dye (Ceres Red BB) was added to the PU coating formulation. The coating layers obtained has the following characteristics: appearance: acceptable; pinholes: 3–5, heat shock: ×4d; dielectric: 4.6 kV; flexibility: ×2d; adherence: good; softening temp.: 236° C.; color: non-uniform red color. In addition, white smog was noted during the preparation of the enamel wires.

Examples 6–12

Using the coating formulations of Comparative Examples 2–4 with the exception that different amounts of titanium oxide particles (Du Pont R-103, particle size: 23 microns) were added, the coating formulations were applied onto wire-conductors after being mixed at a high speed for six (6) hours. The characteristics of obtained enamel wires are shown in Table II.

TABLE II

| Ex. | coating | titanium oxide (PHR) | appearance | flexibility | pinholes | adherence | heat shock | softening temp. (° C.) | dielectric (kV) | color |
|---|---|---|---|---|---|---|---|---|---|---|
| 6 | PE | 5 | good | × 1d | <1 | good | × 3d | 300 | 11 | light sand |
| 7 | PE | 15 | good | × 1d | <1 | good | × 3d | 305 | 10.6 | sand |
| 8 | PE | 50 | acceptable | × 1d | <1 | good | × 3d | 310 | 9.8 | pearl grey |
| 9 | PEI | 5 | good | × 1d | 0 | good | × 2d | 385 | 10.8 | sand |
| 10 | PEI | 30 | good | × 1d | 0 | good | × 2d | 382 | 9.2 | grey beige |
| 11 | PAI | 5 | good | × 1d | 0 | good | × 1d | 409 | 10.6 | sand |
| 12 | PAI | 30 | good | × 1d | 0 | good | × 1d | 415 | 9 | grey beige |

Note:
The colors are determined in accordance with Paint Colors of Taiwan Paint Industry Association.

Examples 13–22

These examples are provided for illustrating the preparation of enamel wires with two coating layers. The inner coating layers were provided by the PEI coating formulation of Comparative Example 3 and the outer coating layers were provided by the PAI coating formulation of Comparative Example 4 with the exception that various amounts of chromic oxide, aluminum oxide, or carbon black inorganic pigments were added into the formulation. The formulations containing inorganic pigments were applied onto the wire in accordance with the same way as that of Examples 6–12 with the exception that the diameter of the copper wire is 1.024 mm. The characteristics of the enamel wires are shown in Table III.

TABLE III

| | inner layer | | outer layer | | | | | characteristics | |
|---|---|---|---|---|---|---|---|---|---|
| Ex. | coating | thickness (μm) | coating | chromic oxide | aluminum oxide | carbon black | thickness (μm) | appearance | flexibility |
| 13 | PEI | 32 | PAI | x | x | x | 7.5 | good | good |
| 14 | PEI | 32 | PAI | 10 PHR | x | x | 7.8 | good | good |
| 15 | PEI | 32 | PAI | 30 | x | x | 7.8 | good | good |
| 16 | PEI | 32 | PAI | 50 | x | x | 8.0 | good | good |
| 17 | PEI | 32 | PAI | x | 10 | x | 7.6 | good | good |
| 18 | PEI | 32 | PAI | x | 30 | x | 7.7 | good | good |
| 19 | PEI | 32 | PAI | x | 50 | x | 7.7 | good | good |
| 20 | PEI | 32 | PAI | x | x | 10 | 7.6 | good | good |
| 21 | PEI | 32 | PAI | x | x | 15 | 7.6 | good | good |
| 22 | PEI | 32 | PAI | x | x | 20 | 7.6 | good | good |

TABLE III-continued

|  | characteristics | | | | | |
|---|---|---|---|---|---|---|
|  | pinholes | adherence | heat shock | softenng tem. (° C.) | dielectric (kV) | color |
| 13 | <1 | good | × 1d | 402 | 8.9 kV | brown |
| 14 | 0 | good | × 1d | 428 | 9.7 kV | indian red |
| 15 | <1 | good | × 1d | 410 | 9.6 kV | classic brown |
| 16 | <1 | good | × 1d | 333 | 8.8 kV | apple green |
| 17 | 0 | good | × 1d | 412 | 8.9 kV | sand |
| 18 | 0 | good | × 1d | 408 | 9.6 kV | pearl grey |
| 19 | 0 | good | × 1d | 385 | 8.9 kV | grey beige |
| 20 | 0 | good | × 1d | 412 | 7.5 kV | peacock blue |
| 21 | 0 | good | × 1d | 404 | 8.5 kV | deep blue |
| 22 | 0 | good | × 1d | 411 | 8.4 kV | black |

Note:
(1) particle size: chromic oxide: 0.6 micron, aluminum oxide: 50 nm, carbon black 30 nm
(2) coating conditions:
inner layer: nine (9) times, outer layer: two (2) times
coating speed: 9 m/min
furnace length: 3.5 m
inlet temperature: 360° C., outlet temperature: 480° C.
(3) The color of enamel wires are determined in accordance with Paint Colors of Taiwan Paint Industry Association.

In addition, during the preparation of the enamel wires of Examples 6–22, the emitted gas is colorless and odorless. It is believed that the application of inorganic pigments will not have the problem of decomposition or cause any environmental problems.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A high temperature resistant colored enamel wire comprising a metal conductive wire and at least one colored coating layer outside the wire, wherein the at least one colored coating layer is provided by a composition comprising:

(a) a synthetic resin, (b) an organic solvent, and (c) an inorganic pigment, and (d) a dispersant selected from the group consisting of surfactants, silanes, titanium coupling agents, aluminum coupling agents and mixtures thereof, said coating composition comprising, based on the total weight of the synthetic resin and the organic solvent, from 80 to 20 weight percent of the synthetic resin and from 20 to 80 weight percent of the organic solvent.

2. The high temperature resistant colored enamel wire according to claim 1, wherein the inorganic pigment is selected from the group consisting of metal oxides, metal powders, carbon black, lead yellow and mixtures thereof.

3. The high temperature resistant colored enamel wire according to claim 2, wherein the inorganic pigment is selected from the group consisting of titanium oxide, zinc oxide, ferric oxide, chromic oxide, aluminum oxide, magnesium oxide, silicon oxide, stibnic oxide and lead oxide.

4. The high temperature resistant colored enamel wire according to claim 2, wherein the metal powders are powders of gold, silver, copper or aluminum.

5. The high temperature resistant colored enamel wire according to claim 1, wherein the inorganic pigment is selected from the group consisting of titanium oxide, chromic oxide, aluminum oxide, carbon black and mixtures thereof.

6. The high temperature resistant colored enamel wire according to claim 1, wherein the particle size of the inorganic pigment is between 0.001 and 50 microns.

7. The high temperature resistant colored enamel wire according to claim 1, the coating composition comprises, based on 100 parts by weight of synthetic resin, from 1 to 60 parts by weight of inorganic pigment.

8. The high temperature resistant colored enamel wire according to claim 1, wherein the synthetic resin is selected from the group consisting of modified or unmodified poly (aldehyde acetal), polyurethane, polyester, polyesterimide, polyamideimide, polyamide, polysulfone, polyimide resins and mixtures thereof.

9. The high temperature resistant colored enamel wire according to claim 1, wherein the organic solvent is selected from the group consisting of cresols, hydrocarbons, phenol, dimethyl phenol, toluene, xylene, ethylbenzene, N,N-dimethyl formamide, N-methylpyrrolidone, esters, ketones and mixtures thereof.

10. The high temperature resistant colored enamel wire according to claim 1, wherein the coating composition comprises, based on the total weight of the synthetic resin and the organic solvent, from 75 to 25 wt % synthetic resin and from 25 to 75 wt % organic solvent.

11. The high temperature resistant colored enamel wire according to claim 1, wherein the weight ratio of dispersant to synthetic resin is from 0.0001 to 0.02.

* * * * *